United States Patent
Östman et al.

(10) Patent No.: US 11,788,457 B2
(45) Date of Patent: Oct. 17, 2023

(54) METHOD FOR EXCHANGING COOLANT IN A COOLING SYSTEM, A CONTROL UNIT, A COOLING SYSTEM AND AN ELECTRIC VEHICLE OR VESSEL COMPRISING THE COOLING SYSTEM

(71) Applicant: VOLVO TRUCK CORPORATION, Gothenburg (SE)

(72) Inventors: Bill Östman, Askim (SE); Johan Öjergren, Kungälv (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/064,006

(22) Filed: Dec. 9, 2022

(65) Prior Publication Data
US 2023/0184157 A1 Jun. 15, 2023

(30) Foreign Application Priority Data
Dec. 10, 2021 (EP) ..................... 21213846

(51) Int. Cl.
*F01P 11/02* (2006.01)
*F01P 7/14* (2006.01)
*F01P 11/06* (2006.01)

(52) U.S. Cl.
CPC ............ *F01P 11/0204* (2013.01); *F01P 7/14* (2013.01); *F01P 11/0276* (2013.01); *F01P 2007/146* (2013.01); *F01P 2011/065* (2013.01)

(58) Field of Classification Search
CPC .... F01P 11/0204; F01P 7/14; F01P 2007/146; F01P 11/02; F01P 11/0276; F01P 2011/065
See application file for complete search history.

(56) References Cited

U.S. PATENT DOCUMENTS 5,809,945 A * 9/1998 Creeron ............... F01P 11/0204
123/41.14

FOREIGN PATENT DOCUMENTS

| DE | 102011100015 A1 | 10/2012 |
| DE | 102013221447 A1 | 5/2015 |
| WO | 2014080278 A2 | 5/2014 |

OTHER PUBLICATIONS

Extended European Search Report in corresponding European Application No. 21213846.5 dated Jun. 15, 2022 (9 pages).

* cited by examiner

Primary Examiner — Jacob M Amick
(74) Attorney, Agent, or Firm — Venable LLP; Jeffri A. Kaminski

(57) ABSTRACT

A method for exchanging coolant in a cooling system, which cooling system comprises at least one pump, an inlet conduit, an outlet conduit. The inlet conduit is connected to at least one external coolant source. The method comprises controlling said at least one pump to flow coolant in the cooling system from the at least one coolant source via the inlet conduit, through the cooling system, to the outlet conduit until the coolant in the cooling system has been at least partly exchanged. The disclosure also relates to a control unit configured to control exchange of coolant according to the method, a cooling system comprising the control unit and a vehicle or vessel comprising the cooling system.

13 Claims, 4 Drawing Sheets

METHOD FOR EXCHANGING COOLANT IN A COOLING SYSTEM, A CONTROL UNIT, A COOLING SYSTEM AND AN ELECTRIC VEHICLE OR VESSEL COMPRISING THE COOLING SYSTEM

TECHNICAL FIELD

The present disclosure relates to a method for exchanging coolant in a cooling system. The present disclosure also relates to a control unit configured to control exchange of coolant in the cooling system, to a cooling system of a vehicle or vessel and to a computer program, a computer readable medium, and to a vehicle or vessel comprising the cooling system.

BACKGROUND

Coolant exchange is often part of scheduled maintenance of vehicles, vessels and industrial systems and is carried out regularly, such as every 48th months. Certain cooling systems, especially applications for electric vehicles and vessels, have a complicated routing for coolant. Electric components often have a design which does not allow draining by gravity. Coolant exchange may therefore be complex operation in which it is hard to drain old coolant, and thereafter fill a satisfying amount of new coolant.

Today, coolant exchange is usually performed through draining by gravity or through draining by air overpressure. In some systems, less than half of the coolant may be drained. In addition, the operation takes a lot of time.

SUMMARY

According to a first aspect of the disclosure, there is provided a method for exchanging coolant in a cooling system, which cooling system comprises at least one pump, an inlet conduit and an outlet conduit. The inlet conduit is connected to at least one external coolant source. The method comprises controlling said at least one pump to flow coolant in the cooling system from the at least one coolant source, through the cooling system, to the outlet conduit until the coolant in the cooling system has been at least partly exchanged.

The method aims at exchanging coolant in the cooling system to a predetermined degree, such as at least 50%, or more preferably at least 75% or more preferably at least 90%, by controlling the at least one pump of the cooling system to push and/or pull out old coolant from the cooling system with new coolant from the coolant source. The method may be an automatic operation, which is started when servicing the system, and which may run while the service staff is free to do other work. Using a pump (or pumps) of the cooling system achieves a faster and more complete coolant exchange as compared to e.g. draining by gravity or by air overpressure.

Traditionally, combustion engine vehicles and vessels comprise direct-connected coolant pumps which are driven by the combustion engine. Therefore, the present solution of using the internal pumps of the cooling system for exchanging the coolant has not been available. The present disclosure is thus mainly aimed at cooling systems of electric vehicles and vessels, such as battery electric vehicles, hybrid electric vehicles, fuel cell vehicles, etc. The disclosure is further aimed at coolant exchange which is performed during maintenance or service, such as in a workshop. Examples of vehicles and vessels may be trucks, busses, construction equipment, passenger cars, and marine and naval vessels such as boats and ships, and air vessels such as aircraft. The cooling system could be used for stationary industrial applications, as well as in combustion engine systems, in which the pumps and valves may be driven by an external power source while the combustion engine is in a standstill mode.

The term "flow" herein means to circulate coolant through the cooling system, through at least one sub-part cooling system or through a conduit, or conduits, from the inlet conduit to the outlet conduit. The circulation is effected by at least one pump of the cooling system. The at least one pump is inherent to the cooling system. The pump may be a circulation pump.

Optionally, the cooling system further comprises a plurality of sub-part cooling systems in fluid communication with each other via at least one pump or at least one valve. Each sub-part cooling system is independently fluidly couplable to the inlet and the outlet conduit. The method further comprises controlling the at least one pump or the at least one valve to open fluid communication to and from one sub-part cooling system at a time in a sequence. The method further comprises, in each part of the sequence, controlling the at least one pump or the at least one valve to close fluid communication to and from any other sub-part cooling system. The method further comprises, in each part of the sequence, controlling the at least one pump to flow coolant from the at least one coolant source, through the respective sub-part cooling system, to the outlet conduit so that coolant in the respective sub-part cooling system is at least partly exchanged.

The sub-part cooling systems may be exemplified by energy storage systems, such as batteries, an electric driveline, a cab of a truck, etc. More generally, a sub-part cooling system may be defined as a part of the cooling system which may comprise at least one coolant pump, and which sub-part cooling system is fluidly couplable and decouplable to and from other sub-part cooling systems. By coupling each sub-part cooling system at a time, in sequence, to the inlet and outlet conduits, waste of coolant may be minimized. The order of the sequence may be pre-determined and application-specific, or it may be determined by a control unit of e.g. a vehicle or vessel comprising the cooling system, depending on current or historic running conditions. The sub-part cooling systems may be connected or disconnected from each other using the at least one pump or the at least one valve, such that coolant may be flowed through one sub-part cooling system at a time.

Optionally, coolant is flowed through each sub-part cooling system for a respective time period before opening fluid communication to and from the next sub-part cooling system in the sequence.

Optionally, the respective time period is based on a value indicative of a flow speed of the at least one pump and on a coolant volume of the respective sub-part cooling system.

The time period may be pre-determined for a specific sub-part cooling system, or it may be set depending on the condition of the sub-part cooling system and/or depending on the condition of other sub-part cooling systems. The condition may be the flow speed of the at least one pump and the coolant volume of a respective sub-part cooling system. The condition may also be the maintenance need of the cooling system, e.g. the time since the last coolant exchange. Accordingly, by flowing the coolant through each sub-part cooling system for a specific time period, the coolant in the respective sub-part cooling system may be at least partly exchanged. The time period is determined such that the coolant is exchanged at least to a predetermined degree, e.g. as required by maintenance regulations.

Optionally, the steps of controlling the at least one pump to flow coolant comprises flowing a first coolant through one sub-part cooling system at a time. The method further comprises, when the sequence is ended, at the end of each part of the sequence determining whether all sub-part cooling systems have been flowed, and if yes, controlling the at least one pump or the at least one valve to open all sub-part cooling systems of the cooling system for fluid communication and flowing a second coolant from the at least one coolant source through all sub-part cooling systems, to the outlet conduit.

In this manner, the first coolant, which may be water, may first be flowed through each sub-part cooling system at a time in the sequence until all sub-part cooling systems have been flowed. Thereafter, the sub-part cooling systems are opened for fluid communication with each other and the second coolant, which may be a pre-mixed coolant, e.g. a mix of water and glycol, is flowed through all the sub-part cooling systems simultaneously. Flowing one sub-part system at a time leads to less waste of coolant.

Optionally, the second coolant is flowed through all sub-part cooling systems for a second pre-determined time period which is based on the value indicative of the flow speed of the at least one pump and on the coolant volume of the cooling system.

The second time period may be pre-determined depending on the total coolant volume of the cooling system, or it may be determined by ocular inspection of the coolant being expelled from the outlet conduit. It may also be determined by sensor readings of the coolant being expelled from the outlet conduit.

Optionally, the steps of controlling the at least one pump to flow coolant comprises flowing a first coolant, followed by flowing a second coolant, through one sub-part cooling system at a time, whereafter the sequence is ended, at the end of each part of the sequence determining whether all sub-part cooling systems have been flowed with a first and a second coolant, and if yes, ending the method.

Thus, the first coolant, which may be water, may first be flowed through one sub-part cooling system, followed by the second coolant, which may be a pre-mixed coolant, e.g. a mix of water and glycol, being flowed through the same sub-part cooling system. The exchange of coolant in one sub-part cooling system is thus finished before exchanging coolant in the next sub-part cooling system in the sequence.

Optionally, the at least one coolant source is provided with an overpressure in relation to an ambient pressure of the cooling system.

Optionally, a coolant drain is connected to the outlet conduit. The coolant drain may be provided with an underpressure in relation to an ambient pressure of the cooling system.

In order to increase the flow rate through the cooling system and to reduce the time required for the exchange of coolant, the coolant source may be provided with an overpressure. Similarly, the coolant drain connected to the outlet conduit may be provided with an underpressure to further increase the flow rate through the cooling system and to reduce the time required for the exchange of coolant.

According to a second aspect of the disclosure, there is provided a control unit which is configured to control exchange of coolant in the cooling system according to the method described above.

According to a third aspect of the disclosure, there is provided a computer program comprising program code to cause the aforementioned control unit to execute the steps of any one of the aspects of the method described above.

According to a fourth aspect of the disclosure, there is provided a computer readable medium having stored thereon the aforementioned computer program.

The control unit may be connected to a computer readable medium having stored thereon a computer program, which comprises code to cause the control unit to execute any of the method steps of the present disclosure. The control unit is configured to exchange coolant in the cooling system by controlling the at least one pump. The control unit may further control the at least one pump or the at least one valve to alternate the different sub-part cooling systems of the coolant system such that they are steered in sequence to be opened or closed for fluid communication. In this way the whole system will be filled with new coolant liquid, sub-part by sub-part. The control unit may use software/computer program to control the at least one pump or the at least one valve to open or close, as well as to switch on and to switch off the at least one pump and to control the speed of the pump. The computer program is configured for the control unit to run the method in the most efficient possible manner, depending on the condition and/or type of the application of the cooling systems, such as for a vehicle or vessel.

According to a fifth aspect of the disclosure, there is provided a cooling system, which cooling system comprises a control unit as described above, an inlet conduit, an outlet conduit, and at least one pump.

According to an aspect of the disclosure, the cooling system further comprises a plurality of sub-part cooling systems in fluid communication with each other via at least one valve.

According to an aspect of the disclosure, the cooling system may further comprise at least one sensor configured to a measure a value indicative of a degree of concentration and/or purity of coolant being expelled via the outlet conduit.

The sub-part cooling systems may be exemplified by energy storage systems, such as batteries, an electric driveline, a cab, etc. Since each sub-part cooling system comprises at least one pump, the sub-part cooling systems may be connected and disconnected from each other using the at least one valve, such that coolant may be flowed through one sub-part cooling system at a time.

According to a sixth aspect of the disclosure, there is provided a vehicle or vessel which comprises the aforementioned cooling system.

The cooling system is mainly intended for electric vehicles and vessels, such as battery electric vehicles, hybrid electric vehicles, fuel cell vehicles, etc., which comprise coolant and heating systems which are generally more complex and consequently do not allow complete emptying of coolant from the system through gravity alone, as compared to corresponding systems in combustion engine vehicles which may commonly be emptied by opening a drain valve/plug. However, the cooling system could also be used for stationary industrial engines and motors, as well as in combustion engine systems, in which the pumps and valves may be driven by an external power source while the combustion engine is in a standstill mode.

BRIEF DESCRIPTION OF THE DRAWINGS

Further objects and advantages of, and features of the disclosure will be apparent from the following description of one or more embodiments, with reference to the appended drawings, where.

DETAILED DESCRIPTION OF EXAMPLE EMBODIMENTS OF THE INVENTION

The present disclosure is developed in more detail below referring to the appended drawings which show examples of embodiments. The disclosure should not be viewed as limited to the described examples of embodiments; instead, it is defined by the appended patent claims. Like numbers refer to like elements throughout the description.

Figure 1:
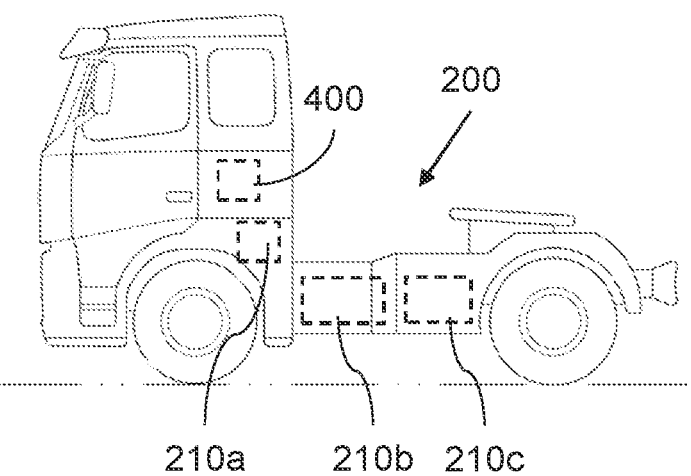
FIG. 1 shows a vehicle comprising a control unit and a cooling system of the present disclosure

FIG. 1 shows an application of the cooling system 200 according to the fifth aspect of the present disclosure, applied in a vehicle or vessel 300, herein exemplified by a truck. The present disclosure is mainly aimed at cooling systems of electric vehicles and vessels, such as battery electric vehicles, hybrid electric vehicles, fuel cell vehicles, etc. Examples of vehicles and vessels may be trucks, busses, construction equipment, passenger cars, and marine and naval vessels such as boats and ships, and air vessels such as aircraft. The cooling system could, however, be used for stationary industrial applications, as well as in combustion engine systems, in which the pumps and valves may be driven by an external power source while the combustion engine is in a standstill mode.

Figure 2:
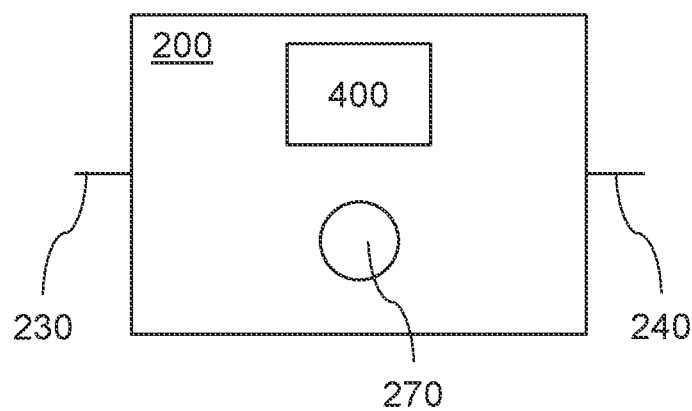
FIG. 2 shows a schematic view of a cooling system according to the present disclosure

FIG. 2 shows the cooling system 200 comprising a control unit 400, an inlet conduit 230, an outlet conduit 240, and at least one pump 270. The at least one pump 270 of the cooling system 200 may be controlled to flow coolant through the cooling system during coolant exchange, such as during maintenance or service of the system at a workshop.

As illustrated in FIG. 2, the cooling system 200 may comprise a control unit 400 configured to control exchange of coolant in the cooling system 200 according to a method 100, 100' 100" described hereinbelow. FIGS. 3-6 show that the cooling system 200 may further comprise a plurality of sub-part cooling systems 210a-c in fluid communication with each other via the at least one pump 270a-d or the at least one valve 220a-d. Each sub-part cooling system 210a-c may comprise at least one pump 270a-d. Alternatively, at least one pump 270a-d may be arranged to flow coolant through multiple sub-part cooling system 210a-c. The control unit 400 is further configured to control the at least one pump 270 or at least one valve 220a-d to open and close fluid communication to and from at least one sub-part cooling systems 210a-c.

A computer program comprising program code may be configured to cause the control unit 400 to execute the exchange of coolant according to the steps described herein below. The computer program may be stored on a computer readable medium.

The control unit 400 is configured to exchange coolant in the cooling system 200 by controlling the at least one pump 270a-d. The control unit 400 may further control the at least one pump 270a-d or the at least one valve 220a-d to alternate different sub-part cooling systems 210a-c of the coolant system 200 such that they are steered in sequence to be opened or closed for fluid communication. In this way the coolant will be exchanged in the whole cooling system 200, sub-part by sub-part. The control unit 400 may use software/computer program to control the at least one valve 220a-d to open or close, as well as to switch on and to switch off the at least one pump 270a-d and to control the speed of the pump 270a-d. The computer program is configured for the control unit 400 to run the method in the most efficient possible manner, depending on the condition and/or type of the application of the cooling systems, such as for a vehicle or vessel. The exchange of coolant in the cooling system 200 is intended for a maintenance stop in a workshop and is automatic and may be started by service staff which is thereafter free to do other work while the control unit 400 carries out the steps of the method described herein.

The cooling system 200 may further comprise an inlet conduit 230 and an outlet conduit 240. The inlet conduit 230 may be connectable to at least one coolant source 500, which may be arranged to provide at least one type of coolant for introduction into the cooling system 200. The at least one coolant source 500 may further be provided with an overpressure in relation to an ambient pressure of the cooling system 200 such that a flow rate through the cooling system 200 may be increased and so that a time required for an exchange of coolant may be reduced.

Similarly, the outlet conduit 240 may be connectable to a coolant drain 600 which may be provided with an underpressure in relation to an ambient pressure of the cooling system 200 to further increase the flow rate through the cooling system 200 and to reduce the time required for the exchange of coolant.

The cooling system 200 may also comprise at least one sensor 250 configured to measure a value indicative of a degree of concentration and/or purity of coolant being expelled via the outlet conduit 240. The measured values may be communicated to the control unit 400, which may control the at least one pump 270a-d and/or the at least one valve 221a-d to flow coolant in the cooling system 200 according to the method described hereinbelow. The value indicative of the degree of concentration and/or purity may be used to determine the time period during which a sub-part cooling system 210a-c, or the cooling system 200, is flowed.

Figure 3:
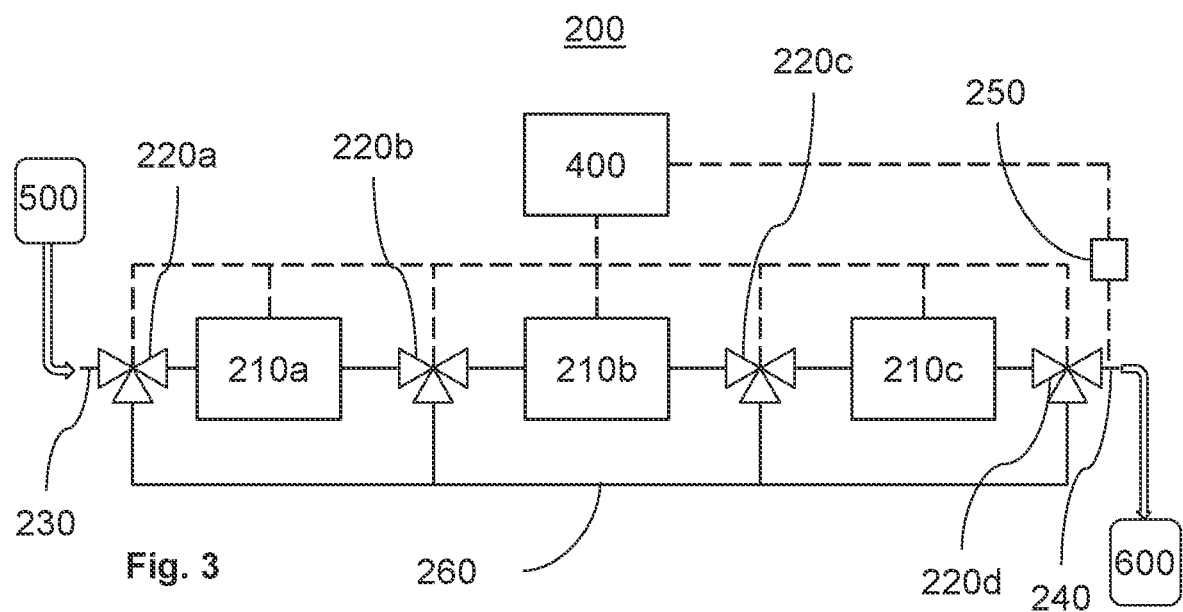
FIG. 3 shows a schematic view of a cooling system according to the present disclosure.

In FIG. 3, the illustrated cooling system 200 comprises three sub-part cooling systems 210a-c. For clarity the sub-part cooling systems may herein be termed a first sub-part cooling system 210a, a second sub-part cooling system 210b and a third sub-part cooling system 210c. However, any number of sub-part cooling systems is possible, as well as a single cooling system 200 without sub-part cooling systems 210a-c. The sub-part cooling systems 210a-c may in practice be exemplified by energy storage systems, such as one or more batteries, an electric driveline, a cab, etc. In the illustrated example of FIG. 3, each sub-part cooling system 210a-c comprises at least one pump (not shown). The sub-part cooling systems 210a-c may be fluidly connected and disconnected from each other using the at least one valve 220a-d, such that coolant may be flowed through one sub-part cooling system 210a-c at a time. The at least one valve may in this example be termed a first valve 220a, a second valve 220b, a third valve 220c and a fourth valve 220d.

A conduit 260 may also be comprised in the cooling system 200 of FIG. 3, which conduit 260 is configured to allow coolant to bypass sub-part cooling systems 210a-c by controlling the at least one valve 220a-d, such that coolant may be flowed through a selected sub-part cooling system 210a-c at a time in a sequence. The conduit 260 may in practice be an integral part of the existing sub-part cooling systems 210a-c which may, via the at least one valve 220a-d, be configured to route coolant from the inlet conduit 230, past at least one sub-part cooling system 210a-c, to another sub-part cooling system 210a-c in the shortest and/or more efficient way. In other words, the conduit 260 is generally not an auxiliary, or additional, conduit in the cooling system 200, but it is illustrated as such, for ease of understanding, in the exemplary embodiment of FIG. 2.

In the example, the illustrated valves 220a-d may be three-way valves which are controlled via the control unit 400 to open fluid communication to and from one sub-part cooling system 210a-c at a time in a sequence.

For instance, the first valve 220a, may be closed to the conduit 260 and opened between the inlet conduit 230 and the first sub-part cooling system 210a. The control unit 400 may further control the second, third and fourth valves 220b-d to close fluid communication to the second sub-part cooling systems 210b and the third sub-part cooling system 210c. At the same time the control unit 400 opens fluid communication from the first sub-part cooling system 210a via the second valve 220b, the conduit 260 and the fourth valve 220d to the outlet conduit 240, such that coolant may flow from the first sub-part cooling system 210a, via the conduit 260 to the outlet conduit 240, substantially without entering the second and the third sub-part cooling systems 210b-c.

Similarly, each of the second and third sub-part cooling systems 210b-c may be opened for fluid communication to and from the respective second and third sub-part cooling systems 210b-c, in sequence, after closing fluid communication to and from the first sub-part cooling system 210a.

Figure 4:
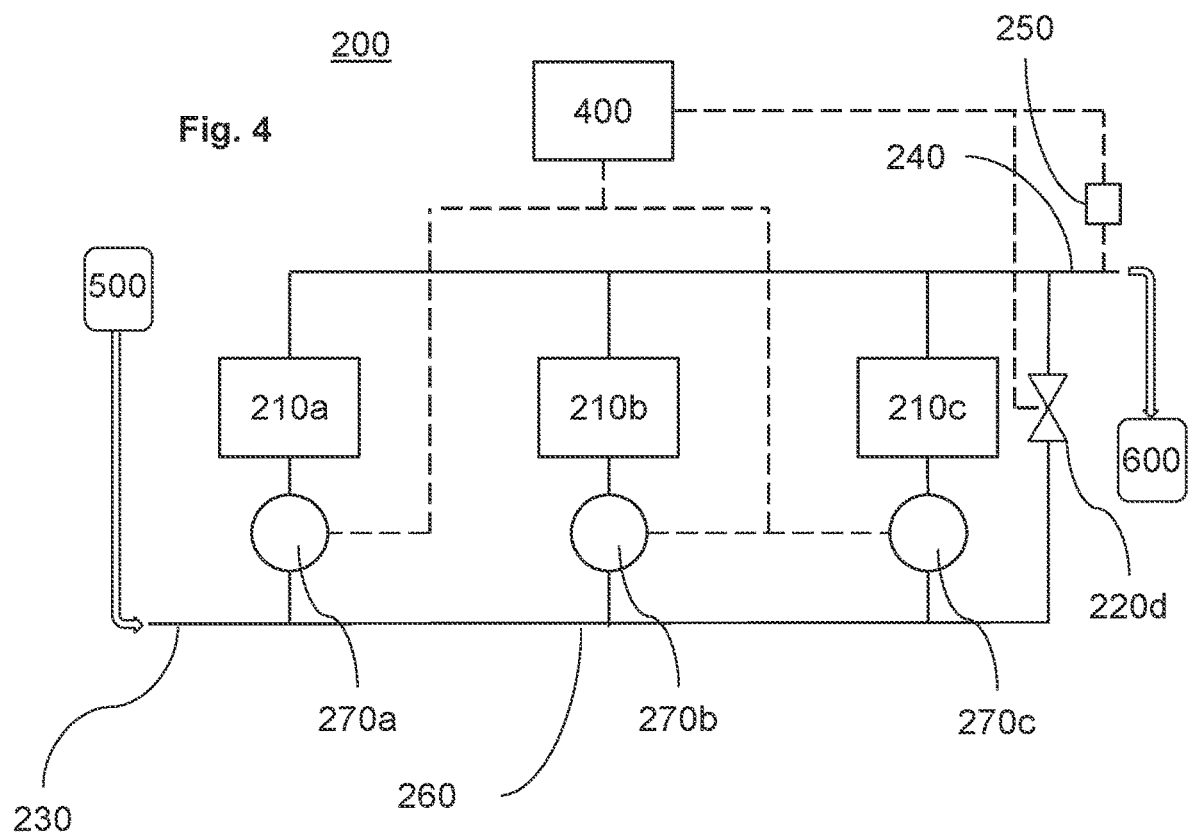
FIG. 4 shows a schematic view of a cooling system according to the present disclosure

The cooling system 200 exemplified in FIG. 4 is also shown as comprising three sub-part cooling systems 210a-c. In the illustrated example of FIG. 4, each sub-part cooling system 210a-c comprises at least one pump 270a-c. The sub-part cooling systems 210a-c may be fluidly connected and disconnected from each other using the at least one pump 270a-c, such that coolant may be flowed through one sub-part cooling system 210a-c at a time. The at least one pump 270a-c may in this example be termed a first pump 270a, a second pump 270b, and a third pump 270c.

The conduit 260 is in FIG. 4 exemplified by a manifold. The manifold is configured to fluidly connect each sub part cooling system 210a-c by controlling the at least one pump 270a-c, such that coolant may be flowed through a selected sub-part cooling system 210a-c at a time in a sequence. When a pump 270a-c is idle, it acts like a closed valve, preventing coolant from flowing through the corresponding sub-part cooling system.

In the example, a return valve 220d may optionally be arranged to open or close a return path for coolant to return to the manifold during normal operation of the cooling system 200 or during exchange of coolant. If the return valve is closed during coolant exchange, the coolant may exit the cooling system 200 via the outlet conduit 240 instead of returning to the manifold. The return valve 220d may be controlled by the control unit 400.

As an example, the first pump 270a, may be controlled to operate between the manifold and the first sub-part cooling system 210a. The control unit 400 may further switch off the second and third pumps 270b-c to close fluid communication between the manifold and the second sub-part cooling systems 210b and to the third sub-part cooling system 210c. The control unit 400 may further control the return valve 220d to prevent coolant from returning to the manifold, such that coolant may flow from the first sub-part cooling system 210a to the outlet conduit 240, substantially without entering the second and the third sub-part cooling systems 210b-c.

Similarly, each of the second and third sub-part cooling systems 210b-c may be opened for fluid communication between the manifold and the outlet conduit 240, by controlling the pumps 270b-c, in sequence, after closing fluid communication to and from the first sub-part cooling system 210a by switch off the first pump 270a.

Figure 5:
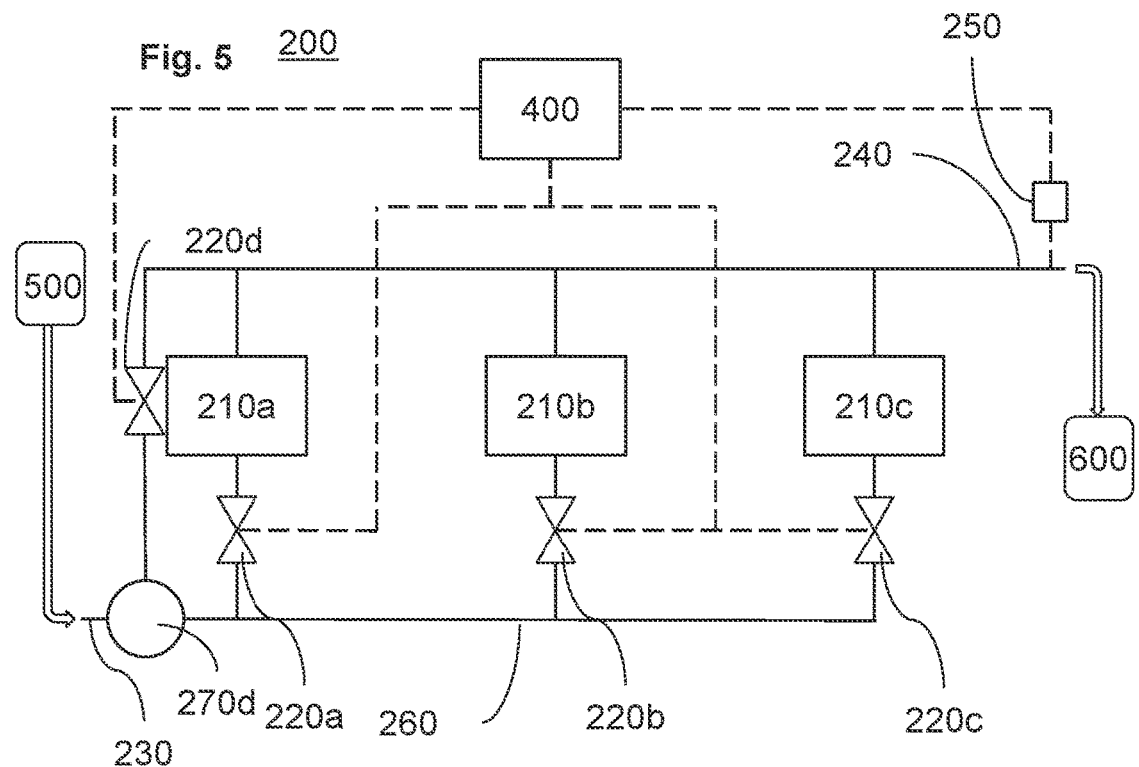
FIG. 5 shows a schematic view of a cooling system according to the present disclosure

In FIG. 5 the exemplified cooling system 200 is also shown as comprising three sub-part cooling systems 210a-c. In the example of FIG. 5, each sub-part cooling system 210a-c comprises at least one valve 220a-c. The sub-part cooling systems 210a-c may be fluidly connected and disconnected from each other by controlling the at least one valve 220a-c, such that coolant may be flowed through one sub-part cooling system 210a-c at a time. As in the example of FIG. 3, the at least one valve 220a-c may in this example be termed a first valve 220a, a second valve 220b, and a third valve 220c.

As in FIG. 4, the conduit 260 of FIG. 5 is exemplified by a manifold. The manifold is configured to fluidly connect each sub part cooling system 210a-c by controlling the at least one valve 220a-c, such that coolant may be flowed through a selected sub-part cooling system 210a-c at a time in a sequence. When a valve 220a-c is closed, it prevents coolant from flowing through the corresponding sub-part cooling system 210a-c.

The cooling system 200 comprises at least one pump 270d connected to the manifold to flow coolant through the cooling system 200.

As in the embodiment of FIG. 4, a return valve 220d may optionally be arranged to allow coolant to return to the manifold during normal operation of the cooling system 200 or during coolant exchange. If the return valve 220d is closed during coolant exchange, the coolant may exit the cooling system 200 via the outlet conduit 240 instead of returning to the manifold. The return valve 220d may be controlled by the control unit 400.

During exchange of coolant, the at least one pump 270d, may be controlled to flow coolant through each sub-part cooling system 210a-c in sequence. The control unit 400 may for instance open the first valve 220a between the manifold and the first sub-part cooling system 210a and close the second and third valves 220b-c to close fluid communication between the manifold and the second sub-part cooling systems 210b and to the third sub-part cooling system 210c. The control unit 400 may further control the return valve 220d to prevent coolant from returning to the manifold, such that coolant may flow from the first sub-part cooling system 210a to the outlet conduit 240, substantially without entering the second and the third sub-part cooling systems 210b-c.

Similarly, each of the second and third sub-part cooling systems 210b-c may be opened for fluid communication between the manifold and the outlet conduit 240, by controlling the valves 220b-c, in sequence, after closing fluid communication to and from the first sub-part cooling system 210a by closing the first valve 220.

Obviously, an inlet valve and an outlet valve (not shown) may be arranged in the examples of FIGS. 4 and 5 to close the inlet conduit 230 and the outlet conduit 240 during normal operation of the cooling system 200.

A method 100, 100', 100" for exchanging coolant in the cooling system 200, which cooling system 200 comprises at least one pump, an inlet conduit 230 and an outlet conduit 240, and where the inlet conduit 230 is connected to at least one external coolant source 500 may generally be described as controlling the at least one pump to flow coolant in the cooling system 200 from the at least one coolant source 500 via the inlet conduit 230, through the cooling system 200, to the outlet conduit 240 until the coolant in the cooling system 200 has been at least partly exchanged. Herein, the cooling system 200 either does not comprise any sub-part cooling systems 210a-c, or the sub-part cooling systems 210a-c are all open for fluid communication such that coolant is circulated through all sub-part cooling systems 210a-c at the same time.

The control unit 400 controls the at least one pump 270a-d. The at least one pump 270a-d is an integral part of the cooling system 200. During normal operation of the cooling system 200, i.e. when coolant is not being exchanged, the at least one pump 270a-d is used to circulate coolant through the cooling system 200. The at least one pump 270a-d may be a circulation pump.

Where the cooling system 200 further comprises a plurality of sub-part cooling systems 210a-c, such as shown in FIGS. 3-5, in fluid communication with each other via at least one pump 270a-d or at least one valve 220a-d, each sub-part cooling system 210a-c is independently fluidly couplable to the inlet conduit 230 and the outlet conduit 240. Each sub-part cooling system 210a-c may comprise at least one pump 270a-d. Alternatively, as in FIG. 5, at least one pump 270d may be arranged to flow coolant through multiple sub-part cooling systems 210a-c in sequence. In other words, some sub-part cooling systems 210a-c may lack an integral pump 270a-d.

Figure 6:
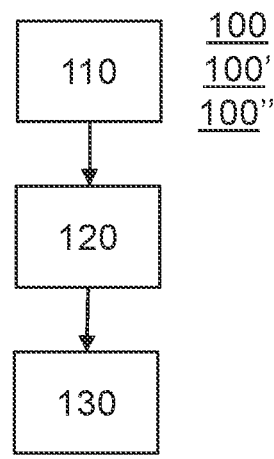
FIG. 6 shows a flowchart of a method according to a first aspect of the present disclosure

As shown in FIG. 6, the method 100, 100', 100" comprises controlling 110 the at least one pump 270a-d or the at least one valve 220a-d to open fluid communication to and from one sub-part cooling system 210a-c at a time in a sequence.

In each part of the sequence, the at least one pump 270a-d or the at least one valve 220a-d is controlled 120 to close fluid communication to and from any other sub-part cooling system 210a-c.

In each part of the sequence, the at least one pump 270a-d is controlled 130 to flow coolant from the at least one coolant source 500, through the respective sub-part cooling system 210a-c, to the outlet conduit 240 so that coolant in the respective sub-part cooling system 210a-c is at least partly exchanged.

The coolant may be flowed through each sub-part cooling system 210a-c for a respective time period before opening fluid communication to and from the next sub-part cooling system 210a-c in the sequence. The respective time period may be based on a value indicative of a flow speed of the at least one pump 270a-d and on a coolant volume of the respective sub-part cooling system 210a-c. The time period may be individually pre-determined for the respective sub-part cooling system 210a-c, or it may be set depending on the condition of the respective sub-part cooling system 210a-c, and/or depending on the condition of the other sub-part cooling systems 210a-c, which are closed for fluid communication. The condition may be the flow speed of the at least one pump 270a-d and the coolant volume of the respective sub-part cooling system 210a-c. The condition may also be the maintenance need of the cooling system 200, such as the time since the last coolant exchange. By flowing the coolant through each sub-part cooling system 210a-c for a specific time period, the coolant in the respective sub-part cooling system 210a-c may be at least partly exchanged. The time period is determined such that the coolant is exchanged at least to a predetermined degree, e.g. as required by maintenance regulations.

Figure 7:
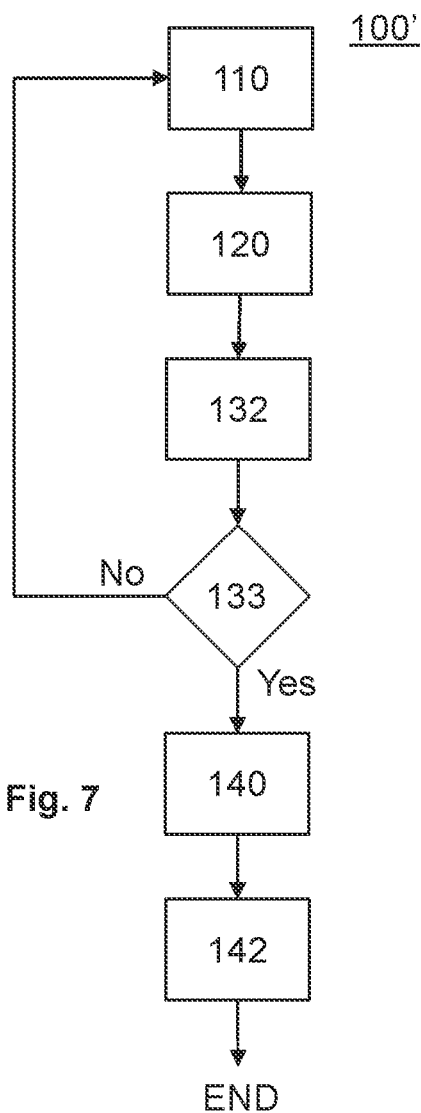
FIG. 7 shows a flowchart of a method according to a second aspect of the present disclosure

In an exemplary embodiment of the method 100', illustrated in FIG. 7, the steps of controlling 130 the at least one pump 270a-d to flow coolant comprises flowing 132 a first coolant through one sub-part cooling system 210a-c at a time, and whereafter the sequence is ended, controlling 140 the at least one pump 270a-d or the at least one valve 220a-d to open all sub-part cooling systems 210a-c of the cooling system 200 for fluid communication and flowing 142 a second coolant from the at least one coolant source through all sub-part cooling systems 210a-c, to the outlet conduit.

Thereby, the first coolant, such as water, or preferably de-ionized water or distilled water, may first be flowed through each sub-part cooling system 210a-c at a time in the sequence until all sub-part cooling systems 210a-c have been flowed. Thereafter, the sub-part cooling systems 210a-c are opened for fluid communication with each other and the second coolant, which may be a pre-mixed coolant, is flowed through all the sub-part cooling systems 210a-c simultaneously. The pre-mixed coolant may be a mix of water and glycol, preferably a mix of de-ionized or distilled water and glycol.

The second coolant may be flowed through all sub-part cooling systems 210a-c for a second pre-determined time period which may be based on the value indicative of the flow speed of the at least one pump 270a-d and on the coolant volume of the cooling system 200.

The second time period may be pre-determined depending on the total coolant volume of the cooling system 200, or it may be determined by ocular inspection of the coolant being expelled from the outlet conduit. It may also be determined by sensor readings of the sensor 250 of the coolant being expelled from the outlet conduit 240.

Figure 8:
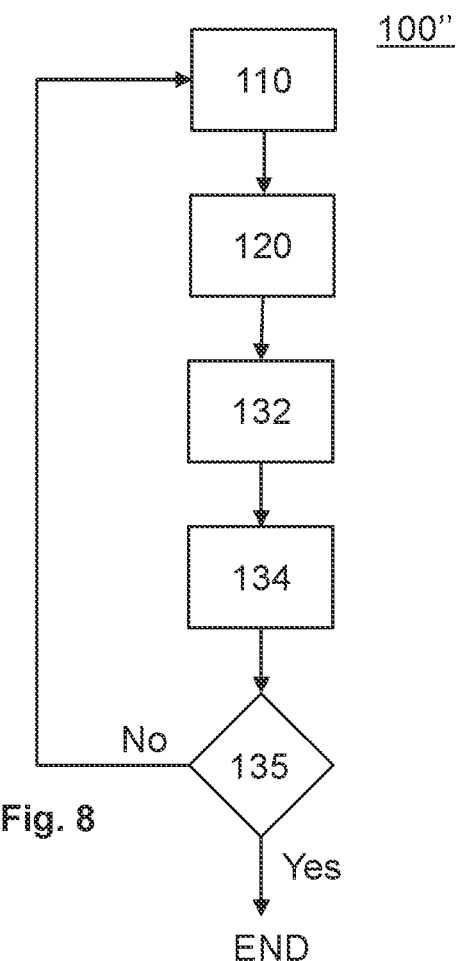
FIG. 8 shows a flowchart of a method according to a third aspect of the present disclosure

In an alternative embodiment shown in FIG. 8, the method 100" may be performed such that the steps of controlling 130 the at least one pump 270a-d to flow coolant comprises flowing 132 a first coolant, followed by flowing 134 a second coolant, through one sub-part cooling system 210a-c at a time, whereafter the sequence is ended.

Thus, the first coolant, which may be water, may first be flowed through one sub-part cooling system 210a-c, followed by the second coolant, which may be a pre-mixed coolant, e.g. a mix of water and glycol, being flowed through the same sub-part cooling system 210a-c. The exchange of coolant in one sub-part cooling system 210a-c is thus finished before exchanging coolant in the next sub-part cooling system 210a-c in the sequence.

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method for exchanging coolant in a cooling system, which cooling system comprises at least one pump, an inlet conduit, an outlet conduit, a plurality of sub-part cooling systems, and wherein the inlet conduit is connected to at least one external coolant source and each sub-part cooling system is independently fluidly couplable to the inlet conduit and the outlet conduit via at least one pump or at least one valve, the method comprises:

controlling said at least one pump to flow coolant in the cooling system from the at least one coolant source via the inlet conduit, through the cooling system, to the outlet conduit until the coolant in the cooling system has been at least partly exchanged;

controlling the at least one pump or the at least one valve to open fluid communication to and from one sub-part cooling system at a time in a sequence;

in each part of the sequence, controlling the at least one pump or the at least one valve to close fluid communication to and from any other sub-part cooling system; and in each part of the sequence, controlling the at least one pump to flow coolant from the at least one coolant source, through the respective sub-part cooling system, to the outlet conduit so that coolant in the respective sub-part cooling system is at least partly exchanged.

2. The method according to claim 1, wherein coolant is flowed through each sub-part cooling system for a respective time period before opening fluid communication to and from the next sub-part cooling system in the sequence.

3. The method according to claim 2, wherein the respective time period is based on a value indicative of a flow speed of the at least one pump and on a coolant volume of the respective sub-part cooling system.

4. The method according to claim 1, wherein the steps of controlling the at least one pump to flow coolant comprises flowing a first coolant through one sub-part cooling system at a time, whereafter the sequence is ended, at the end of each part of the sequence determining whether all sub-part cooling systems have been flowed, and if yes, controlling the at least one pump or the at least one valve to open all sub-part cooling systems of the cooling system for fluid communication and flowing a second coolant from the at least one coolant source through all sub-part cooling systems, to the outlet conduit.

5. The method according to claim 4, wherein the second coolant is flowed through all sub-part cooling systems for a second pre-determined time period which is based on a value indicative of the flow speed of the at least one pump and on a coolant volume of the cooling system, whereafter the method is ended.

6. The method according to claim 1, wherein the steps of controlling the at least one pump to flow coolant comprises flowing a first coolant, followed by flowing a second coolant, through one sub-part cooling system at a time, whereafter the sequence is ended, at the end of each part of the sequence determining whether all sub-part cooling systems have been flowed with a first and a second coolant, and if yes, ending the method.

7. The method according to claim 1, wherein the at least one coolant source is provided with an overpressure in relation to an ambient pressure of the cooling system.

8. The method according to claim 1, wherein a coolant drain is connected to the outlet conduit and wherein the coolant drain is provided with an underpressure in relation to an ambient pressure of the cooling system.

9. A control unit configured to control exchange of coolant in the cooling system according to the method of claim 1.

10. A non-transitory computer readable medium having stored thereon program code to cause a control unit of to execute the steps of claim 1.

11. A cooling system comprising:

a control unit according to claim 9, an inlet conduit, an outlet conduit, and at least one pump.

12. The cooling system according to claim 11, further comprising a plurality of sub-part cooling systems in fluid communication with each other via at least one pump or at least one valve.

13. A vehicle or vessel comprising the cooling system according to claim 11.

* * * * *